(A)

(B)

United States Patent Office 3,746,651
Patented July 17, 1973

3,746,651
RADIOTHERMOLUMINESCENT MATERIALS AND RADIOTHERMOLUMINESCENCE DOSIMETERS
Noboru Kotera, Kamakura, Satoru Nishikawa, Yokosuka, and Hitoshi Sakamoto, Chigasaki, Japan, assignors to Dai Nippon Toryo Kabushiki Kaisha, Osaka-shi, Japan
Filed Aug. 7, 1970, Ser. No. 62,116
Claims priority, application Japan, Aug. 13, 1969, 44/64,111
Int. Cl. C09k 1/54
U.S. Cl. 252—301.4 F
6 Claims

ABSTRACT OF THE DISCLOSURE

Complex oxide luminescent material consisting of magnesium oxide-silicon dioxide and containing trace amount of terbium or cerium as an activator shows strong thermoluminescence with the flow peak at ca. 190° C. under excitation by means of electron beam or various radiations and thus is useful as the phosphor for thermoluminescent dosimeter.

---

This invention relates to radiothermoluminescence dosimeters adapted for use in detection and measurement of exposure dose of irradiated radiation.

The utilization of γ-ray emitted from radioactive materials such as $^{60}$Co electron beam obtained from electron accelerating apparatus, X-ray obtained from X-ray generating apparatus, etc. has recently been increasing in industrial and medical fields. X-ray, for example, is utilized in diagnosis in medical purposes and non-destructive testings in industrial fields, whereas $^{60}$Co is not only used in medical fields but also utilized for exposure of radiation for improvement of species in agricultural fields or for preservation of food in fresh state and also for synthesis and improvement of industrial materials, and such utilization is presumed to be still increasing hereafter. In order to establish precautions against radiation, therefore, it is indispensible to measure the exposure dose of radiation by means of a simple procedure and various dosimetry methods have been developed for this purpose.

Particularly the thermoluminescent dosimeter utilizing the thermoluminescent phenomenon of phosphor has attracted the attention in the fields of health physics, radiology, etc. and has been employed widely in these fields because of the advantages thereof such as simple operation, compactness, availability in various forms such as powder, tablet, etc., and ability for precise measurement of cumulative dose over a wide range of various radiations.

Radiothermoluminescent materials are provided with an ability to accumulate the energy absorbed therein when said materials are exposed to radiations such as X-ray, and to emit said accumulated energy as luminescence, i.e., thermoluminescence, when said materials acquire thermal energy for example by heating. Consequently the quantitative determination of exposure dose can be realized by measuring the light sum or light intensity of said thermoluminescence.

Although the mechanism of thermoluminescence is specific to each phosphor, said mechanism can be qualitatively explained as follows: In radiothermoluminescent materials, impurity elements or crystalline lattice defects present in the host crystal form metastable energy state, at which electrons or positive holes excited from the ground state by means of radiation are trapped. Then, when the crystal is heated to a sufficiently high temperature, electrons or positive holes trapped in the metastable state are released by means of thermal activity and brought back to the ground state, emitting luminescence in the visible or near-visible wavelength range.

Most phosphors show thermoluminescence at room temperature or even at lower temperature due to relatively shallow metastable energy state thereof, and therefore gradually emit thermoluminescence at room temperature or lower to lose the energy accumulated therein after exposure to radiation. Namely such materials show marked fading, and consequently it is impossible to determine exactly the cumulative dose of radiation within a determined period. For use in thermoluminescent dosimeter, the phosphor is required to be provided with a trapping level or metastable state of a proper energetic depth, but such property is only found in very limited number of phosphors.

The conventional radiothermoluminescent materials employed in the dosimetry of radiation such as LiF, $Li_2B_4O_7$:Mn, $CaSO_4$:Mn, $CaF_2$:Mn, etc. are associated with various drawbacks such as low sensitivity, narrow dosimetry range, high energy dependency, large fading or cumbersome handling requirements, etc., and many developmental efforts have been made in order to conquer such drawbacks.

In the course of investigation along the principle indicated above, the present inventors found that a complex oxide phosphor consisting of magnesium oxide-silicon dioxide and containing a trace amount of terbium or cerium as activator shows a strong thermoluminescence with glow peak at ca. 190° C. under the excitation by electron beam or various radiations and therefore can be utilized as a highly sensitive phosphor for thermoluminescent dosimeter.

The radiothermoluminescence dosimeters according to the present invention are composed of materials which can be expressed by the general formula:

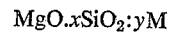

$$MgO \cdot xSiO_2 : yM$$

wherein M stands for an effective activating element, namely at least one of terbium and cerium; x stands for the number of moles of silicon dioxide to be used at the preparation of phosphor with respect to 1 mole of magnesium oxide; and y represents the number of gram atoms of activator M with respect to 1 mole of magnesium oxide. The thermoluminescence output, namely light intensity or light sum of the phosphor is strongly influenced by the values of these x and y.

The following is a brief description of the drawings.

FIG. 4(A) and FIG. 4(B) show the relationships between the exposure dose and the intensity of thermoluminescence when X-ray or gamma ray of $^{60}$Co is irradiated on silicon dioxide-magnesium oxide activated with terbium.

Figure 5:
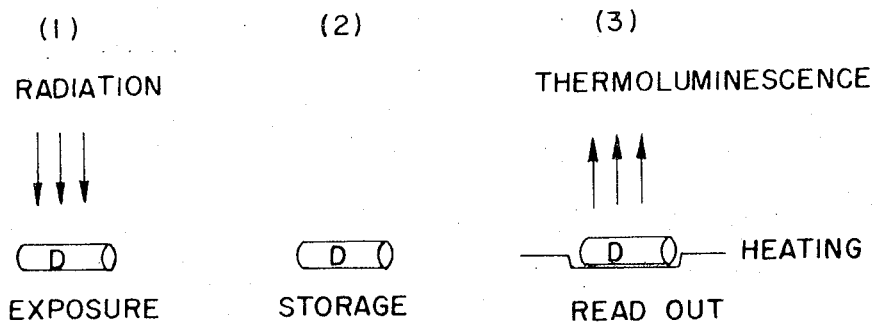
Figure 5:
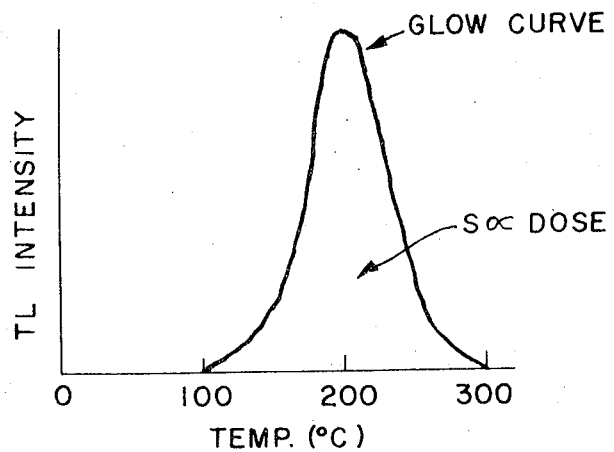

FIG. 5 illustrates a simple thermoluminescent dosimetry method with a glow curve used to determine the dose of radiation stored.

Figure 1:
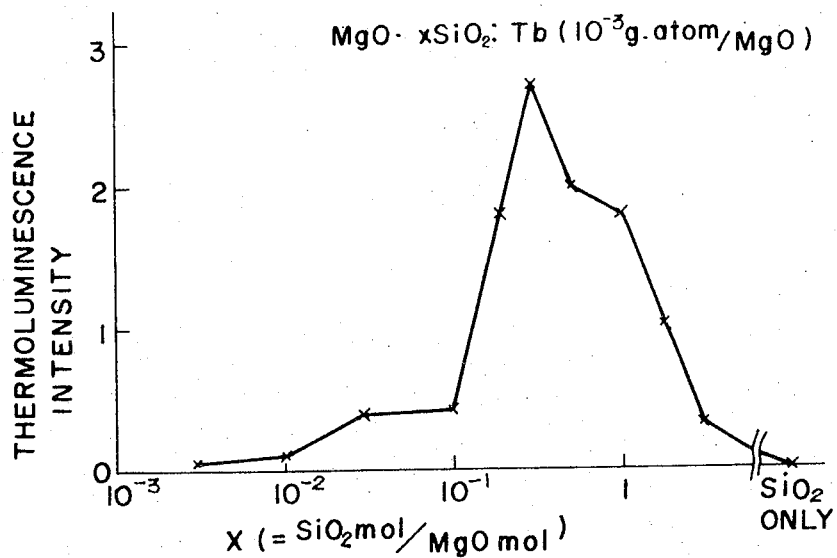
FIG. 1 illustrates the relationship between the ratio of $SiO_2/MgO$ defined as x and the intensity of thermoluminescence obtained. It illustrates the influence of variations in the composition of host material in terbium activated magnesium silicate phosphor.

FIG. 1 showing the relationship between the ratio of $SiO_2/MgO$ or x and the intensity of thermoluminescence, represents the influence of composition of host material in terbium activated magnesium silicate phosphor as an example of the radiothermoluminescent materials according to the present invention. For the purpose of thermoluminescence dosimetry the intensity of thermoluminescence is preferred to be as strong as possible, and it is readily observed from FIG. 1 that the value of $x$ should be maintained within a range from 0.03 to 3.0, preferably from 0.2 to 1.0. The most preferable value of $x$ is to be about 0.3, while at such value of $x$ the spontaneous luminescence under excitation by radiations is entirely or almost not observable.

Figure 2:
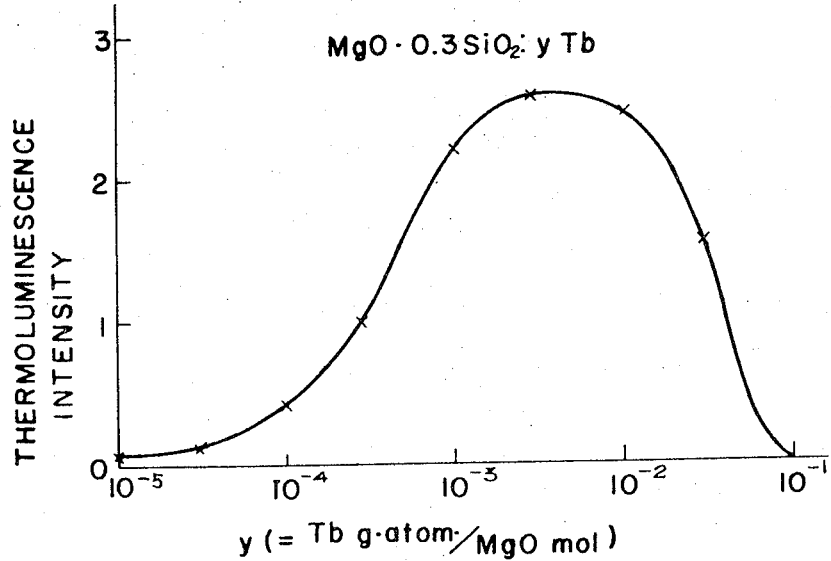
FIG. 2 shows the relationship between the concentration of terbium and the intensity of the thermoluminescence obtained with a phosphor of $MgO \cdot 0.3SiO_2$.

Although the value of $y$ is kept constant at $10^{-3}$ in the case of above-mentioned figure, the desirable range for $x$ mentioned above remains fundamentally unchanged so long as the value of $y$ is present within a range from $10^{-5}$ to $3 \times 10^{-2}$. Further, these ranges are fundamentally alien from the firing conditions of phosphor such as heating temperature, heating period, surrounding atmosphere, etc. FIG. 2 shows the relationship between the concentration of terbium and the intensity of thermoluminescence and indicates the effect of concentration of terbium in a phosphor with composition of $MgO \cdot 0.3SiO_2$ as an example of the radiothermoluminescent materials for the radiothermoluminescence dosimeters according to the present invention. As discussed above, the intensity of thermoluminescence is preferred to be as strong as possible for the purpose of thermoluminescence dosimetry, and from this figure it is readily understandable that the value of $y$ should be maintained within a range of $10^{-5}$ to $3 \times 10^{-2}$, preferably $10^{-3}$ to $10^{-2}$. Although the above discussion is made on the value of $x$ of 0.3, the desirable range for $y$ mentioned above remains fundamentally unchanged so long as the value of $x$ is present within a range of 0.03 to 3.0. Further these ranges are fundamentally alien from the firing conditions of phosphor such as heating temperature, heating period, surrounding atmosphere, etc.

The material for the radiothermoluminescence dosimeters according to this invention can be prepared by using magnesium oxide or magnesium compound easily convertible to said oxide upon heating such as magnesium carbonate, magnesium hydroxide, magnesium sulfate, etc. and silicon dioxide or silicon compound easily convertible to silicon dioxide upon heating as the host material of radiothermoluminescent material, mixing sufficiently at least a member of terbium oxide, terbium compound easily convertible thereto upon heating, cerium oxide and cerium compound easily convertible thereto upon heating as the activator with said host material, and heating thus obtained mixture under air atmosphere in an electric furnace followed by rapid cooling and crushing, if necessary. Said mixing can be carried out either by dry process on a ball mill or roll mill or by wet process in which said components are made into paste by means of water or ethyl alcohol, or said components are coprecipitated by means for example of hydroxides. Said heating is generally carried out within a temperature range of 1300° to 2000° C. The heating period generally ranges from 0.5 to 20 hours, depending on the size of crucible used, charging amount in the crucible, etc. Particularly desirable result can be obtained by effecting the heating within a temperature range of 1500° to 1800° C. for 2 to 10 hours. It is also possible to heat the obtained material again in an inert gas atmosphere such as argon or nitrogen in order to enhance the intensity of thermoluminescence by a few tens percent.

The material thus prepared is made into thermoluminescence dosimeters by means of sealing said material in a glass tube together with inert gas, or of solidifying said material, for example by sintering said material, by compressing said material with a small amount of tabletting agent such as potassium bromide to form a tablet or by embedding said material in a thermoresistant resin such as fluorine resin or silicon resin. For this purpose, any other known means or method for forming thermoluminescence dosimeters is naturally applicable so long as the radiothermoluminescent material constitutes the essential component of the dosimeter.

Figure 3:
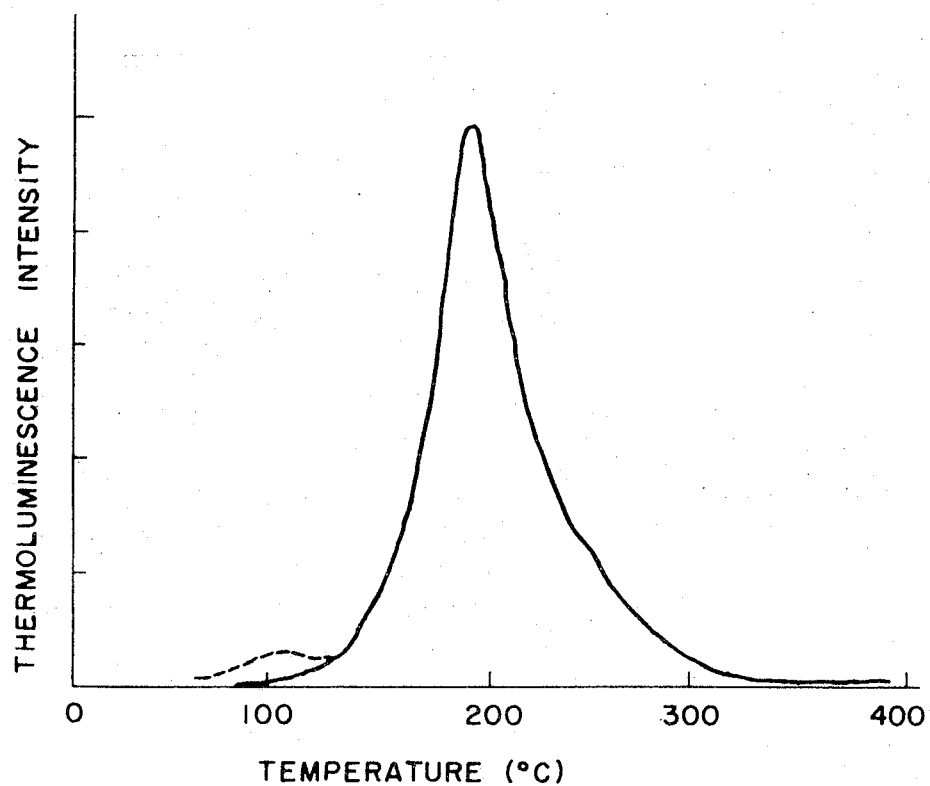
FIG. 3 shows the relationship between the heating temperature and the intensity of thermoluminescence, i.e., glow curve, after irradiation of X-ray on silicon dioxide-magnesium oxide activated with terbium.

FIG. 3 shows the relationship between the heating temperature and the intensity of thermoluminescence, i.e., glow curve, after irradiation X-ray on a radiothermoluminescence dosimeter composed of a complex oxide radiothermoluminescent material consisting of silicon dioxide-magnesium oxide activated with terbium as an example of radiothermoluminescence dosimeters according to the present invention. This glow curve is characterized by the narrow distribution thereof around a single peak at 190° C., which is particularly favorable for use in radiation dosimetry. For the purpose of radiation dosimetry utilized is the main peak at ca. 190° C. Further, the smaller peak represented by broken line in the drawing may appear by the irradiation of light on the sample prior to the measurement of thermoluminescence, but disappears completely when the sample is kept completely away from light. FIG. 4(A) and FIG. 4(B) show the relationship between the exposure dose and the intensity of thermoluminescence when X-ray or gamma ray of $^{60}Co$ is irradiated on a radiothermoluminescence dosimeter composed of a complex oxide radiothermoluminescent material consisting of silicon dioxide-magnesium oxide activated with terbium as an example of radiothermoluminescent material according to the present invention.

As is clarified in the foregoing explanation, the thermoluminescence dosimeter according to the present invention linearly responds to the extremely wide variation of exposure ranging from $10^{-4}$ to $5 \times 10^4$ R. (Roentgen), and consequently said dosimeter allows precise quantitative measurement of the dose within the range mentioned above. Furthermore, said dosimeter qualitatively permits the dosimetry from several tens $\mu R.$ to $10^5$ R., and thus can be concluded to be extremely suitable for determining the cumulative dose of various radiations such as X-ray, gamma ray, etc.

Figure 4:
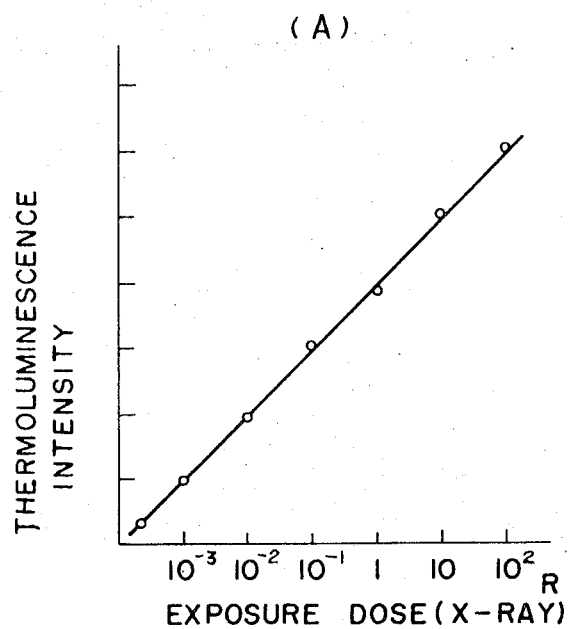
Figure 4:
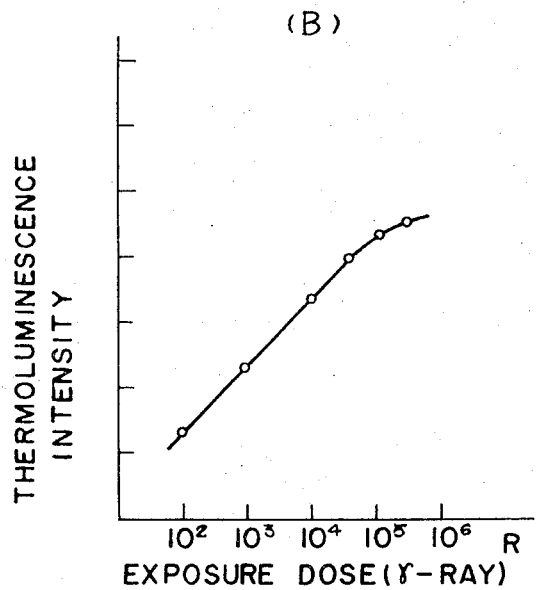

The characteristics explained in FIG. 3 and FIG. 4 remain fundamentally unchanged when the ratio $SiO_2/MgO$ or $x$ is present within a range of 0.03 to 3.0 and when the concentration of terbium or $y$ is present within a range of $10^{-5}$ to $3 \times 10^{-2}$.

The radiothermoluminescence dosimeter according to the present invention of which characteristics have thus far been disclosed has various extremely useful advantages when applied to dosimetry of cumulative dose of various radiations such as X-ray, gamma ray, etc. Firstly to be noted is the advantage resulting from the property of glow curve already shown in FIG. 3. The presence of peak in the glow curve at ca. 190° C. significantly decreases the fading of intensity of thermoluminescence after exposure to radiation, and therefore enables the precise control over the dose of exposed radiation for prolonged period and also the centralized measurement and control of exposure dose even at distant place. For example, the fading after 60 days at normal temperature is only less than 3%. Besides the not excesively high peak temperature prevents the use of very high temperature, deterioration of precision due to thermal radiation and the use of complicated heating device. Furthermore the glow curve provided with single peak and narrow distribution without accompanying sub-peaks allows precise and accurate measurement by simple heating operation without requiring any preliminary thermal treatment, since any sub-peak, if present in the glow curve at a lower temperature region than the main peak, will change the dimension thereof with the lapse of time after the exposure to the radiation, preventing accurate measurement, and a complicated thermal treatment should be applied to the sample prior to the measurement in order to remove the effect of such sub-peaks. Further, a wide distribution of glow curve indicates, though not clearly observable as separate sub-peak, the presence of certain factor in the lower temperature region causing time-dependent fading of thermoluminescence. Furthermore a wide distribution of glow curve requires heating the sample to a temperature considerably higher than the temperature at which the main peak is formed, and therefore accompanies the elevated influence of thermal radiation to light detector from the heater and surroundings, thus limiting considerably the accuracy and range of measurement. In such case, even if the heating is interrupted midways without reaching the summit of glow curve in order to decrease such undesirably effect of said thermal radiation, the retentive portion maintained in the sample will give rise to a larger error in the case of repeated use of sample.

The second advantage lies in the fact that the high thermoluminescent output and the linear response over a wide range of dose as shown in FIG. 4 not only allows precise measurement of low dose but also enables to apply a single sample for various purposes without preparing classified dosimeters. This point will be further clarified in the following.

At the measurement of dose as low as several mR. or even lower, the effect of thermal radiation from the heater and surroundings as well as of other noises will deteriorate signal-to-noise ratio at heating step and will make it impossible to obtain satisfactory accuracy unless the phosphor used is provided with a particularly high thermoluminescence intensity. At low dose range, even a very weak thermal radiation will become a problem and it is nearly impossible to prevent completely the effect thereof by means of ordinary technical means. Also such complete prevention of effect of thermal radiation, if possible, will require very complicated expensive mechanism and will therefore be hardly applicable for practical measuring equipment.

On the other hand, the radiothermoluminescene dosimeter according to this invention, owing to very high thermoluminescent output of the material, enables, the measurement of low radiation dose with high accuracy without requiring any additional mechanism or devices for preventing the effect of thermal radiation but by means of very simple heating system such as placing the sample on a heating plate. For example, the thermoluminescent output of radiothermoluminescence dosimeter according to this invention obtainable in Example 2 described later amounts to 100 times that of well-known radiothermoluminescene dosimeter of LiF under excitation with gamma ray of $^{60}$Co. With such radiothermoluminescent material it is possible to realize a thermoluminescent dosimeter capable of determining extremely weak natural radioactivity, as weak as 0.01 mR., with a high precision.

In addition to the astonishing capability for measuring such low radiation dose, this invention is capable of providing an extremely small detecting element. For example the measurement of low dose mentioned above can be realized with phosphor sealed in a small glass tube external diameter 1.0 mm. and length 10 mm. The measurement of extremely low dose with such miniaturized detector is far beyond the conventional concept of dosimeter and provides powerful means for measuring local distribution of radiation dose. Furthermore the extremely wide linear response range means applicability of a single element form a low dose to a very high dose with sufficient accuracy. As already explained the dosimeter according to this invention is capable of measuring the dose as high as $10^4$ R., which itself is hardly realizable in conventional radiothermoluminescent material. LiF, for example, loses linear response thereof against exposure dose at several hundred R. or 1000 R. and begins to show so-called super-linearity, losing the accuracy. Further the fact that a detecting element for high radiation dose is also applicable for low dose as explained above has never been achieved in prior dosimeters such as ionization chamber nor in prior radiothermoluminescence dosimeters, and enables to use a single detector for every purpose in every field.

Thus, according to this invention provided is a simple thermoluminescent dosimetry methods as disclosed in the following, with reference to FIG. 5. It is also one of the objects of this invention to provide such simple and highly reliable dosimetry method. The thermoluminescence dosimeter according to this invention, which is indicated by D in the drawing, is exposed to unknown amount of radiation such as X-ray, gamma-ray, etc. to store the exposed energy in said dosimeter, and the stored energy, or exposed dose of radiation is determined by the glow curve of thermoluminescence generated upon heating. Thus, by calibrating the linear relationship between the the dose and thermoluminescence intensity or the area under the glow curve in advance, it is possible to determine, from the output of dosimeter, the exposure dose directly in the unit proper for the radiation, for example most commonly in Roentgen unit.

Radiothermoluminescent material showing glow peak at ca. 190° C. can also be produced by employing thallium, indium, bismuth or tin as activator instead of terbium or cerium mentioned above, such material generally shows weaker thermoluminescent intensity compared with the case activated with terbium or cerium or accompanies sub-peaks in addition to the main peak located at ca. 190° C., and therefore is inferior as the phosphor for thermoluminescent dosimeter.

Though the description herein only refers to the use of $Tb_2O_3$ as terbium oxide, the compound expressed by $Tb_4O_7$ naturally gives completely same result, and the amount of terbium in this invention is only specified in terms of the number of gram-atom of elementary terbium with respect to 1 mole of magnesium oxide.

This invention will be further clarified by the following examples.

EXAMPLE 1

A radiothermoluminescence dosimeter was composed of the radiothermoluminescent material which was prepared as follows:

| | Moles |
|---|---|
| Magnesium oxide (MgO) | 1 |
| Anhydrous silicon dioxide ($SiO_2$) | 0.3 |
| Terbium oxide ($Tb_2O_3$) | 0.0005 | were mixed sufficiently in a ball mill or roll mill and then heated at 1700° C. for 2 hours in air in an alumina or quartz crucible to obtain radiothermoluminescent material showing thermoluminescence with glow peak at ca. 190° C. as shown in FIG. 3 under excitation by means of X-ray or various radiations.

EXAMPLE 2

A radiothermoluminescence dosimeter was composed of the radiothermoluminescent material which was prepared as follows:

| | Moles |
|---|---|
| Magnesium oxide (MgO) | 1 |
| Anhydrous silicon dioxide ($SiO_2$) | 0.5 |
| Terbium oxide ($Tb_2O_3$) | 0.0007 | were mixed sufficiently in a ball mill or roll mill and then heated at 1600° C. for 5 hours in air in a thermoresistant container such as alumina or quartz crucible to obtain radiothermoluminescent material showing thermoluminescence with glow peak at ca. 190° C. as shown in FIG. 3 under excitation by means of X-ray or various radiations.

EXAMPLE 3

A radiothermoluminescence dosimeter was composed of the radiothermoluminescent material which was prepared as follows:

| | Moles |
|---|---|
| Magnesium carbonate ($MgCO_3$) | 1 |
| Anhydrous silicon dioxide ($SiO_2$) | 0.3 |
| Terbium oxide ($Tb_2O_3$) | 0.0005 |

Magnesium carbonate was heated at 1000° C. for 2 hours in an alumina or quartz crucible, then mixed sufficiently with the above other materials in a ball mill or roll mill and again heated at 1600° C. for 2 hours in air in an alumina or quartz crucible to obtain radiothermoluminescent material showing thermoluminescence with glow peak at ca. 190° C. as shown in FIG. 3 under excitation with X-ray or various radiations.

EXAMPLE 4

A radiothermoluminescence dosimeter was composed of the radiothermoluminescent material which was prepared as follows:

| | Moles |
|---|---|
| Magnesium sulfate ($MgSO_4 \cdot 7H_2O$) | 1 |
| Anhydrous silicon dioxide ($SiO_2$) | 0.3 |
| Terbium oxide ($Tb_2O_3$) | 0.001 |

Magnesium sulfate was heated at 700° C. for 1 hour in air in an alumina or quartz crucible to obtain anhydrous magnesium sulfate, which is then mixed sufficiently with the above other materials on a ball mill or roll mill and again heated at 1600° C. for 3 hours in an alumina or quartz crucible to obtain radiothermoluminescent material showing thermoluminescence with glow peak at ca. 190° C. as shown in FIG. 3 under excitation with X-ray or other radiations.

EXAMPLE 5

A radiothermoluminescence dosimeter was composed of the radiothermoluminescent material which was prepared as follows:

| | Moles |
|---|---|
| Magnesium hydroxide ($Mg(OH)_2$) | 1 |
| Anhydrous silicon dioxide ($SiO_2$) | 0.3 |
| Terbium oxide ($Tb_2)O_3$) | 0.0007 | were mixed sufficiently on a ball mill or roll mill and heated at 1800° C. for 2 hours in air in an alumina or quartz crucible to obtain radiothermoluminescent material showing thermoluminescence with glow peak at ca. 190° C. under excitation with X-ray or various radiations.

EXAMPLE 6

A radiothermoluminescence dosimeter was composed of the radiothermoluminescent material which was prepared as follows:

| | Moles |
|---|---|
| Magnesium oxide (MbO) | 5 |
| Anhydrous silicon dioxide ($SiO_2$) | 0.5 |
| Terbium oxide ($Tb_2O_3$) | 0.0005 | where sufficiently mixed on a ball mill or roll mill and then heated at 1800° C. for 3 hours in air in an alumina or quartz crucible to obtain radiothermoluminescent material showing thermoluminescence with glow peak at ca. 190° C. under excitation with X-ray or other radiations.

EXAMPLE 7

A radiothermoluminescence dosimeter was composed of the radiothermoluminescent material which was prepared as follows:

| | Moles |
|---|---|
| Silicon dioxide ($SiO_2 \cdot nH_2O$) | 0.3 |
| Magnesium oxide (MgO) | 1 |
| Terbium oxide ($Tb_2O_3$) | 0.0007 |

Silicon dioxide was heated at 1000° C. in air for 2 hours in an alumina or quartz crucible to obtain anhydrous silicon dioxide, which was then sufficiently mixed with the above other two materials on a ball mill or roll mill and heated at 1700° C. in air for 5 hours in an alumina or quartz crucible to obtain radiothermoluminescent material showing thermoluminescence with glow peak at ca. 190° C. under excitation with X-ray or other various radiations.

EXAMPLE 8

A radiothermoluminescence dosimeter was composed of the radiothermoluminescent material which was prepared as follows:

| | Moles |
|---|---|
| Magnesium oxide (MgO) | 1 |
| Anhydrous silicon dioxide ($SiO_2$) | 0.3 |
| Terbium nitrate ($Tb(NO_3)_3 \cdot 6H_2O$) | 0.001 | were mixed sufficiently on a ball mill or roll mill, then heated at 1600° C. in air for 2 hours in an alumina or quartz crucible and further heated at 100° C. for 1 hour in an inert gas atmosphere, for example, argon gas stream of flow rate of 1 l./min. to obtain radiothermoluminescent material showing thermoluminescence, with glow peak at ca. 190° C. and with an intensity ca. 15% higher than that obtainable by heating in air, under excitation with X-ray or other radiations.

EXAMPLE 9

A radiothermoluminescence dosimeter was composed of the radiothermoluminescent material which was prepared as follows:

| | Moles |
|---|---|
| Magnesium oxide (MgO) | 1 |
| Anhydrous silicon dioxide ($SiO_2$) | 0.2 |
| Terbium oxide ($Tb_2O_3$) | 0.0005 | were mixed sufficiently on a ball mill or roll mill, and heated at 1500° C. in air for 5 hours in a thermoresistant container such as alumina or quartz crucible. The mixture was further mixed and heated at 1200° C. for 2 hours in an alumina or quartz tube under an inert gas atmosphere, for example, nitrogen gas stream of flow rate of 2 l./min. to obtain radiothermoluminescent material showing thermoluminescence under excitation with X-ray or other radiations, with glow peak at ca. 190° C. as shown in FIG. 3 and with an intensity ca. 20% enhanced than that obtainable by heating in air.

EXAMPLE 10

A radiothermoluminescence dosimeter was composed of the radiothermoluminescent material which was prepared as follows:

| | Moles |
|---|---|
| Magnesium oxide (MgO) | 1 |
| Anhydrous silicon dioxide ($SiO_2$) | 0.2 |
| Terbium oxide ($Tb_2O_3$) | 0.007 | were mixed sufficiently on a ball mill or roll mill and heated at 1800° C. in air for 2 hours in an alumina or quarts crucible. The mixture was further mixed, and heated at 1800° C. in air for 1 hour. This heating was cooled rapidly to obtain radiothermoluminescent material showing strong thermoluminescence with glow peak at ca. 190° C. under excitation with X-ray or various radiations.

EXAMPLE 11

A radiothermoluminescence dosimeter was composed of the radiothermoluminescent material which was prepared as follows:

| | Moles |
|---|---|
| Magnesium oxide (MgO) | 1 |
| Anhydrous silicon dioxide ($Si_3O_2$) | 0.3 |
| Cerium oxide ($Ce_2O_3$) | 0.0005 | were mixed sufficiently on a ball mill or roll mill, then heated at 1500° C. in air for 2 hours in an alumina or quartz crucible and cooled rapidly to obtain radiothermoluminescent material showing thermoluminescence with glow peak at ca. 190° C. under excitation with X-ray or various radiations.

EXAMPLE 12

A radiothermoluminescence dosimeter was composed of the radiothermoluminescent material which was prepared as follows:

| | Moles |
|---|---|
| Magnesium oxide (MgO) | 1 |
| Anhydrous silicon dioxide ($SiO_2$) | 0.3 |
| Cerium nitrate ($Ce(NO_3)_3 \cdot 6H_2O$) | 0.01 | were mixed sufficiently on a ball mill or roll mill and heated at 1600° C. in air for 5 hours in a thermoresistant container such as alumina or quartz crucible to obtain radiothermoluminescent material showing thermoluminescence with glow peak at ca. 190° C. as shown in FIG. 3 under excitation with X-ray or various radiations.

What we claim is:

1. A material for a radiothermoluminescence dosimeter which comprises complex oxide host crystal of magnesium oxide-silicon oxide and an activator element incorporated therein, wherein a molar ratio of silicon oxide to magnesium oxide is about 0.3 and the activator element is terbium in an amount of $10^{-3}$ to $10^{-2}$ gram-atom with respect to 1 mole of magnesium oxide.

2. A material for a radiothermoluminescence dosimeter according to claim 1 wherein the activator element is terbium in an amount of about $10^{-3}$ gram-atom with respect to 1 mole of magnesium oxide.

3. A process for producing radiothermoluminescent material which comprises mixing:
   (a) magnesium oxide or a magnesium compound easily convertible thereto upon heating,
   (b) silicon oxide or a silicon compound easily convertible to silicon oxide upon heating, in an amount of 0.2 to 1.0 mole of silicon oxide with respect to 1 mole of said magnesium oxide, and
   (c) terbium or compounds thereof in an amount of $10^{-3}$ to $10^{-2}$ gram-atom with respect to 1 mole of said magnesium oxide and heating the thus obtained mixture at a temperature ranging from 1500° to 1800° C. in air for 2 to 10 hours.

4. A process for producing radiothermoluminescent material according to claim 3 wherein the molar ratio of silicon oxide to magnesium oxide upon mixing is 0.3 to 0.5.

5. A process for producing radiothermoluminescent material according to claim 3 wherein the molar ratio of silicon oxide to magnesium oxide is about 0.3 and the gram-atomic ratio of terbium to magnesium is about $10^{-3}$.

6. A process for producing radiothermoluminescent material which comprises mixing:
   (a) magnesium oxide or a magnesium compound easily convertible thereto upon heating,
   (b) silicon oxide or a silicon compound easily convertible to silicon oxide upon heating, in an amount of 0.2 to 1.0 mole of silicon oxide with respect to 1 mole of said magnesium oxide, and
   (c) terbium or compounds thereof in an amount of $10^{-3}$ to $10^{-2}$ gram-atom with respect to 1 mole of said magnesium oxide, heating the thus obtained mixture at a temperature ranging from 1500° to 1800° C. in air for 2 to 10 hours and again heating said mixture at a temperature ranging from 1000° to 1500° C. for 1 to 5 hours in an argon or nitrogen atmosphere.

References Cited
UNITED STATES PATENTS

| | | | |
|---|---|---|---|
| 2,254,956 | 9/1941 | Aschermann | 252—301.4 F |
| 3,260,675 | 7/1966 | McAllister | 252—301.4 F |

ROBERT D. EDMONDS, Primary Examiner